US012216864B2

(12) United States Patent
Steiner et al.

(10) Patent No.: US 12,216,864 B2
(45) Date of Patent: Feb. 4, 2025

(54) ROBUST TOUCH SENSING VIA ULTRA-SONIC SENSORS

(71) Applicant: Infineon Technologies AG, Neubiberg (DE)

(72) Inventors: Christoph Steiner, St. Margarethen (AT); Lavinia-Elena Ciotirca, Buchare (RO); Redouane Djeghader, Munich (DE); Mihai-Liviu Tudose, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 319 days.

(21) Appl. No.: 17/463,764

(22) Filed: Sep. 1, 2021

(65) Prior Publication Data
US 2023/0062377 A1   Mar. 2, 2023

(51) Int. Cl.
*G06F 3/041* (2006.01)
*G06F 3/043* (2006.01)
*G01S 15/02* (2006.01)
*G01S 15/08* (2006.01)
*G01S 15/12* (2006.01)
*G06F 3/0354* (2013.01)
*G06F 3/038* (2013.01)

(52) U.S. Cl.
CPC .......... *G06F 3/04186* (2019.05); *G06F 3/043* (2013.01); *G01S 15/02* (2013.01); *G01S 15/08* (2013.01); *G01S 15/12* (2013.01); *G06F 3/03547* (2013.01); *G06F 3/0383* (2013.01); *G06F 3/0433* (2013.01); *G06F 3/0436* (2013.01)

(58) Field of Classification Search
CPC .... G06F 3/04186; G06F 3/043; G06F 3/0433; G06F 3/0436; G06F 3/03547; G06F 3/0383; G01S 15/02; G01S 15/08; G01S 15/12
See application file for complete search history.

(56) References Cited

U.S. PATENT DOCUMENTS

| | | | | |
|---|---|---|---|---|
| 2014/0362055 | A1* | 12/2014 | Altekar | G06F 3/0418 345/177 |
| 2016/0259441 | A1* | 9/2016 | Sha | G06F 1/3262 |
| 2018/0032211 | A1* | 2/2018 | King | G06F 3/04186 |
| 2018/0090062 | A1* | 3/2018 | Nakamura | G09G 3/3233 |
| 2018/0129355 | A1* | 5/2018 | Lynn | G06F 3/0227 |
| 2018/0341359 | A1* | 11/2018 | Khajeh | G06F 3/0436 |
| 2019/0337016 | A1* | 11/2019 | Nakao | B06B 1/0692 |
| 2020/0167540 | A1* | 5/2020 | Kim | G06F 3/041 |

* cited by examiner

*Primary Examiner* — William Boddie
*Assistant Examiner* — Saifeldin E Elnafia
(74) *Attorney, Agent, or Firm* — Harrity & Harrity, LLP

(57) ABSTRACT

A method of sensing touch on a touch surface of a touch structure includes: transmitting, from within an enclosed interior volume, an ultra-sonic transmit signal towards an inner surface of the touch structure that is arranged counter to the touch surface; receiving, from within the enclosed interior volume, an ultra-sonic reflected signal produced from the ultra-sonic transmit signal being reflected by the inner surface; acquiring a plurality of digital samples from the ultra-sonic reflected signal; calculating an Euclidean distance of the plurality of digital samples to a first plurality of reference samples; and determining whether a no-touch event or a touch event has occurred at the touch surface based on the Euclidean distance.

27 Claims, 4 Drawing Sheets

ROBUST TOUCH SENSING VIA ULTRA-SONIC SENSORS

BACKGROUND

Touch sensing through metal surfaces using ultra-sonic waves is currently being investigated as an alternative to capacitive touch sensing principles. Ultra-sonic sensing relies on the transmission of an ultra-sonic signal and the reception and processing of the reflected waveform from the touch surface. The waveform will depend on the existence or non-existence of a touch event. However, there are many types of disturbances that can influence the reflected waveform and affect the detection of a true touch even over no-touch events and false touch events. For example, ultra-sonic sensing is vulnerable to electrical cross talk between the transmitter and receiver via the printed circuit board (PCB), ultra-sonic cross talk between transmitter and receiver via a coupling medium, multipath propagation of the ultra-sonic signal (e.g., when the transmitted signal is reflected by various interfaces in the sensor package), electrical and mechanical receiver noise, temperature dependency, and environmental disturbances like dirt or water present on the touch surface.

For a robust and reliable touch detection method, the difference between a no-touch event and a touch event must be made large, even with all the above mentioned disturbances. At the same time, the signal processing and calibration effort must be kept small to stay competitive in terms of usability and cost of the sensor. Accordingly, an ultra-sonic touch sensor that can achieve both of these objectives may be desirable.

SUMMARY

One or more embodiments provide a touch sensor, including: a housing having a recess; a touch structure coupled to the housing and arranged over the recess such that the recess forms an enclosed interior volume, wherein the touch structure includes a touch surface and an inner surface arranged opposite to the touch surface, wherein the inner surface faces towards the enclosed interior volume; a transmitter arranged inside the enclosed interior volume, wherein the transmitter configured to transmit an ultra-sonic transmit signal towards the inner surface; a receiver arranged inside the enclosed interior volume and coupled to the transmitter via a propagation path, wherein the receiver configured to receive an ultra-sonic reflected signal produced from the ultra-sonic transmit signal being reflected by the inner surface; and a sensor circuit arranged inside the enclosed interior volume and configured to receive the ultra-sonic reflected signal from the receiver, acquire a plurality of digital samples from the ultra-sonic reflected signal, calculate a first Euclidean distance of the plurality of digital samples to a first plurality of reference samples, and determine whether a no-touch event or a touch event has occurred at the touch surface based on the first Euclidean distance.

One or more embodiments provide a method of sensing touch on a touch surface of a touch structure. The method includes transmitting, from within an enclosed interior volume, an ultra-sonic transmit signal towards an inner surface of the touch structure that is arranged counter to the touch surface; receiving, from within the enclosed interior volume, an ultra-sonic reflected signal produced from the ultra-sonic transmit signal being reflected by the inner surface; acquiring a plurality of digital samples from the ultra-sonic reflected signal; calculating a first Euclidean distance of the plurality of digital samples to a first plurality of reference samples; and determining whether a no-touch event or a touch event has occurred at the touch surface based on the first Euclidean distance.

BRIEF DESCRIPTION OF THE DRAWINGS

Embodiments are described herein making reference to the appended drawings.

DETAILED DESCRIPTION

Figure 1A:
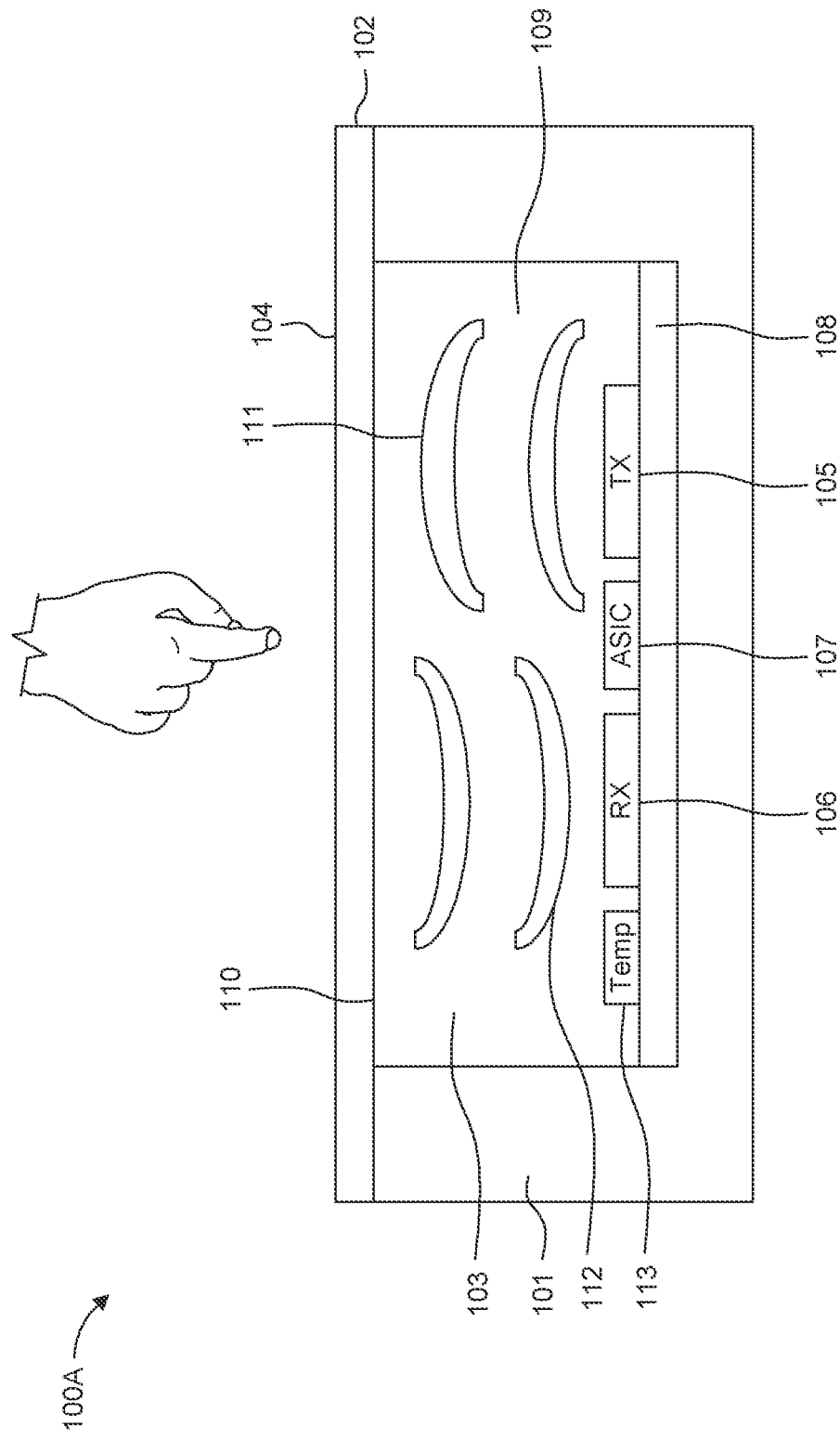
FIG. 1A illustrates an ultra-sonic touch sensor according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation. For example, lateral, vertical, and overlapping spatial or positional relationships may be described in reference to another element or feature, without being limited to a specific orientation of the device as a whole.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

FIG. 1A illustrates an ultra-sonic touch sensor 100A according to one or more embodiments. As defined herein, an ultra-sonic signal is a sound wave having a frequency of 20 kHz or higher.

The ultra-sonic touch sensor 100A includes a housing comprising an encapsulant 101 (e.g., molding) and a touch structure 102 that forms an interior volume 103 with the encapsulant 101. In other words, as part of the housing, the encapsulant 101 has a recess that becomes the interior volume 103 when the touch structure 102 encloses the recess.

In particular, the touch structure 102 is used as a lid or a package cover that rests upon the sidewalls of the encapsulant 101. The interior volume 103 is a cavity that is formed by the enclosure of the encapsulant 102 and the touch structure 102. The touch structure 102 may be made of one or more metal layers and/or plastic layers and/or layers made out of other solid material and includes a touch surface 104 at its external interface with the environment. The touch surface 104 is arranged and operable to receive contact (i.e., touches) from a user that can be detected by sensor circuitry.

The interior volume 103 contains the circuitry used for detecting no-touch and touch events at the touch surface 104. A touch event is defined as an instance when a user makes contact with the touch surface 104 and a no-touch event is all other circumstances, including the occurrence of disturbing influences (i.e., error sources) that may occur in the absence of a touch event. The circuitry is configured to distinguish between a touch event and a no-touch event, taking into account possible errors originating from the disturbing influences.

The circuitry includes a transmitter (TX) 105 configured to transmit ultra-sound signals, a receiver (RX) 106 configured to receive reflected ultra-sound signals, and a sensor circuit 107 (e.g., an application specific integrated circuit (ASIC)) configured to generate the ultra-sound signals for transmission by the transmitter 105, perform signal processing on reflected ultra-sound signals received by the receiver 106, evaluate the reflected ultra-sound signals for detecting no-touch events and touch events, and control one or more components of the sensor 100A, including control of the transmitter 105, the receiver 106, or any of the signal processing components of the signal processing chain of the sensor circuit 107. The transmitter 105 and the receiver 106 may both be sound transducers with a flexible membrane that vibrates to either produce sound waves, in the case of a transmitter, or in response to receiving sound waves, in the case of a receiver.

The transmitter 105, the receiver 106, and the sensor circuit 107 may be arranged on common circuit substrate 108 (e.g., a PCB) that is disposed at the base of the encapsulant. The common circuit substrate 108 is configured to electrically couple the sensor circuit 107 to both the transmitter 105 and the receiver 106. The transmitter 105, the receiver 106, and the sensor circuit 107 may be separate ICs (i.e., dies) or may be combined in any combination into one or two ICs. Additionally, the both the transmitter 105 and the receiver 106 may be implemented at separate transceivers such that two transmitters and two receivers (i.e., one TX/RX pair per transceiver) are provided.

The remaining portion of the interior volume 103 is filled with a coupling medium 109, such as a silicone gel, soft epoxy, liquid, or any other material that enables the propagation of ultra-sonic signals with substantially no attenuation. The coupling medium 109 is a non-gaseous medium.

The coupling medium 109 is in contact with an inner (interior) surface 110 of the touch structure 102, the interface of which is configured to reflect transmitted ultra-sonic signals 111 back into the interior volume 103 to be received by the receiver 106 as reflected ultra-sonic signals 112. Thus, the transmitter 105 and the receiver 106 are coupled together by the coupling medium 109. The coupling medium 109 and the inner surface 110 form a propagation channel between the transmitter 105 and the receiver 106.

A touch event at the touch surface 104 of the touch structure 102 causes a change in a property of the propagation channel and thereby changes the propagation of the ultra-sonic signals through the propagation channel from the transmitter 105 to the receiver 106. In other words, a property of an ultra-sonic signal propagating along the propagation channel changes in response to a touch event at the touch surface 104 and the sensor circuit 107 is configured to detect the touch event, including one or more characteristics thereof, including amount of contact pressure, a contact duration, and a contact location on the touch surface 104. In particular, the sensor circuit 107 is configured to distinguish between a touch event and a no-touch event, taking into account possible error sources such as electrical and ultra-sonic cross-talk, multipath propagation, noise, temperature, and environmental disturbances such as dirt or water on the touch surface 104.

The sensor circuit 107 is configured to generate an ultra-sonic transmit signal for each touch/no-touch decision. Upon receipt of each reflected ultra-sonic signal, the sensor circuit 107 makes a touch/no-touch decision. Each ultra-sonic transmit signal is a short signal pulse (e.g., having a duration of about 100 ns up to about 1 us). The pulse can have any shape (e.g., rectangular, sinusoid, Gaussian, a Gaussian derivative, etc.) or may be a chirp signal whose frequency increases or decreases. The time between subsequent touch detections can be in the order of 25 us, for example.

On the receiver side, the sensor circuit 107 includes an analog signal processing chain and a digital signal processing chain, both of which may include one or more optional components. The analog signal processing chain may include a direct down-converter and low-pass filter as optional components. The direct down-converter may include any form of direct down-conversion of the reflected ultra-sonic signal 121. For example, squaring, absolute value, rectification, and so on may be used for performing the direct down-conversion. Analog circuit blocks for such a down-conversion processing can be a multiplier or even just a diode. The low-pass filter cut-off frequency should be tuned to the bandwidth of the transmitted ultra-sonic signal and the bandwidth of the transmitter 105. For example, the low-pass filter cut-off frequency could be set 1 MHz or 2 MHz.

The sensor circuit 107 includes an analog-to-digital converter (ADC) whose ADC sampling frequency can be tuned to the low-pass filter, should one be present, and approximately 5-times higher than the low-pass filter cut-off frequency. In case of a 1 MHz low-pass filter cut-off frequency, the ADC sampling frequency may be set to 5 msps. The bit width of the ADC can be, for example, 8 bit or higher. The ADC is configured to capture multiple digital samples for each ultra-sonic transmit signal) and store the digital samples in memory. A digital processor is operable to evaluate the digital samples received in a predetermined observation window to determine whether there is a no-touch event or touch event corresponding to the ultra-sonic transmit signal. The predetermined observation window has a start time and an end time.

The start time for the storing of digital samples depends on the time the ultra-sonic transmit signal is transmitted by the transmitter 105 and the time-of-flight of the first reflection in the system. The time-of-flight of the first reflection is a predetermined time it takes for the ultra-sonic transmit signal to travel from the transmitter 105, to the inner surface 110, and back to the receiver 106. The distance traveled and the speed of travel of the ultra-sonic signal are known parameters. The time-of-flight may also be affected by type of material used for the inner surface 110 (e.g., the material of the touch substrate 102) and the coupling medium 109. The time-of-flight may also be affected by temperature. A temperature sensor 113 may be used inside the interior volume 103 to measure the temperature and provide the temperature measurement to the sensor circuit 107 for calculating the time-of-flight. In any case, the time-of-flight is known by the sensor circuit 107 at the time the ultra-sonic transmit signal 111 is transmitted by the transmitter 105.

The observation window of reflected ultra-sonic signal will start at the expected time-of-flight of the first reflection plus the duration of the signal pulse. Any signals received prior to the start time (e.g., between the transmission time and the transmission time plus the time-of-flight) do not carry information about the touch event and can be disregarded and/or not stored.

The observation window duration can be preconfigured. For example, 10 us or 20 us are possible observation window durations. The longer the observation window, the more robust the touch/no-touch decision. However, a longer observation window generally has a longer processing time, requires more memory, more silicon die size and energy consumption and/or requires a longer time between transmitted ultra-sonic signals, making the refresh rate of the system slower. The stored and windowed digital samples are fed to a decision algorithm used by a digital processor for making the touch/no-touch decision. The decision algorithm can be a neuronal network that has been trained via machine learning beforehand.

The decision algorithm may include calculating the Euclidian distance to a set of reference signals and select a category that corresponds to the minimum Euclidian distance. The decision is taken based on the minimum Euclidian distance from all calculated distances. Categories can include "no touch", "touch", "disturbance", "water drop", "touch with strength F[1]", "touch with strength F[2]", "touch with strength F[M]", etc., where M is an integer representative of a number of different touch strengths that can be evaluated.

Figure 1B:
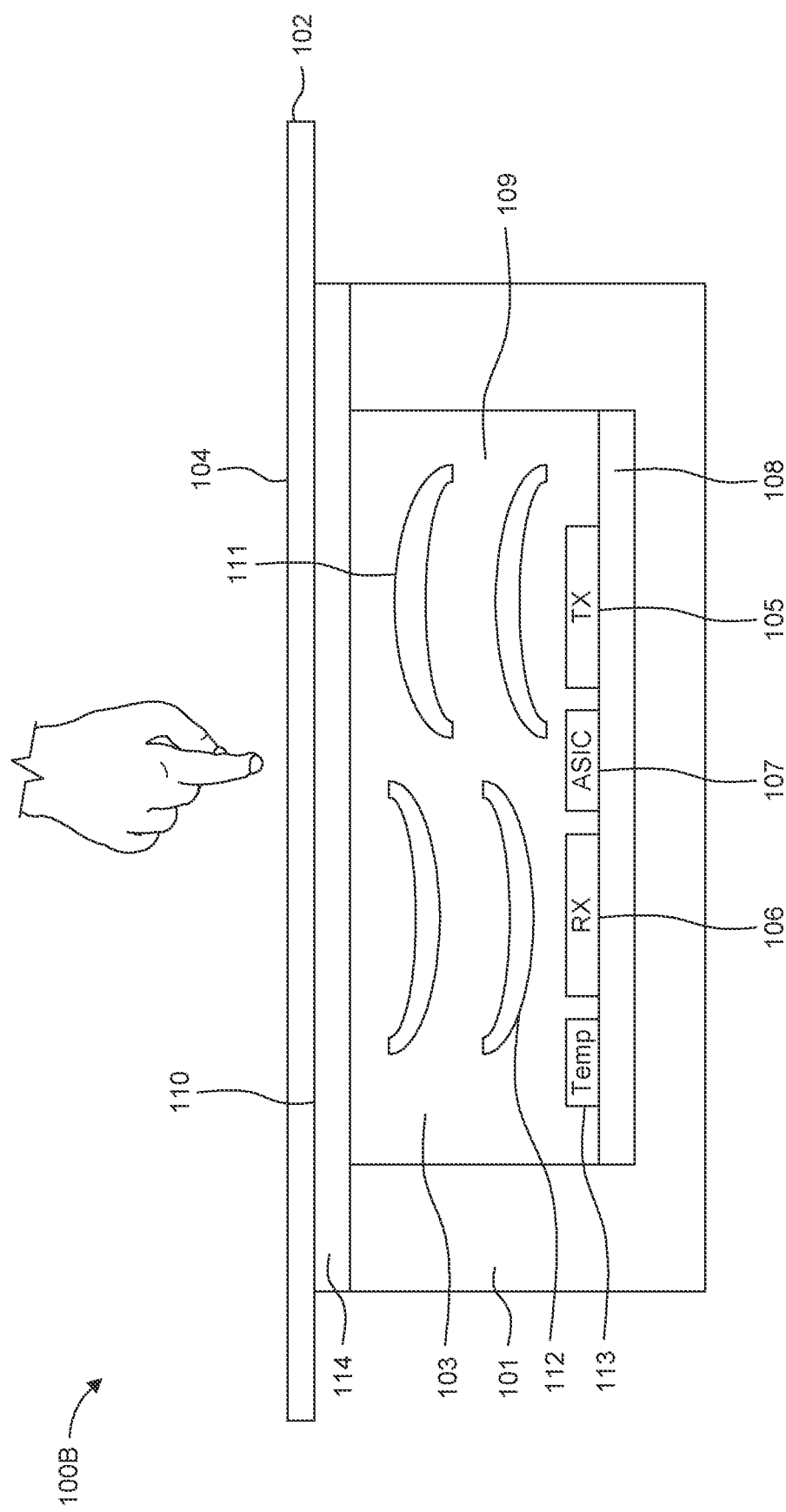
FIG. 1B illustrates another ultra-sonic touch sensor according to one or more embodiments.

FIG. 1B illustrates an ultra-sonic touch sensor 100B according to one or more embodiments. The ultra-sonic touch sensor 100B is similar to ultra-sonic touch sensor 100A except a package cover 114 is interposed between the touch structure 102 and the encapsulant 101 and between the touch structure 102 and the interior volume 103. Thus, there is an interface between the touch structure 102 and the package cover 114 and another interface between the package cover 114 and the coupling medium 109.

Figure 2:
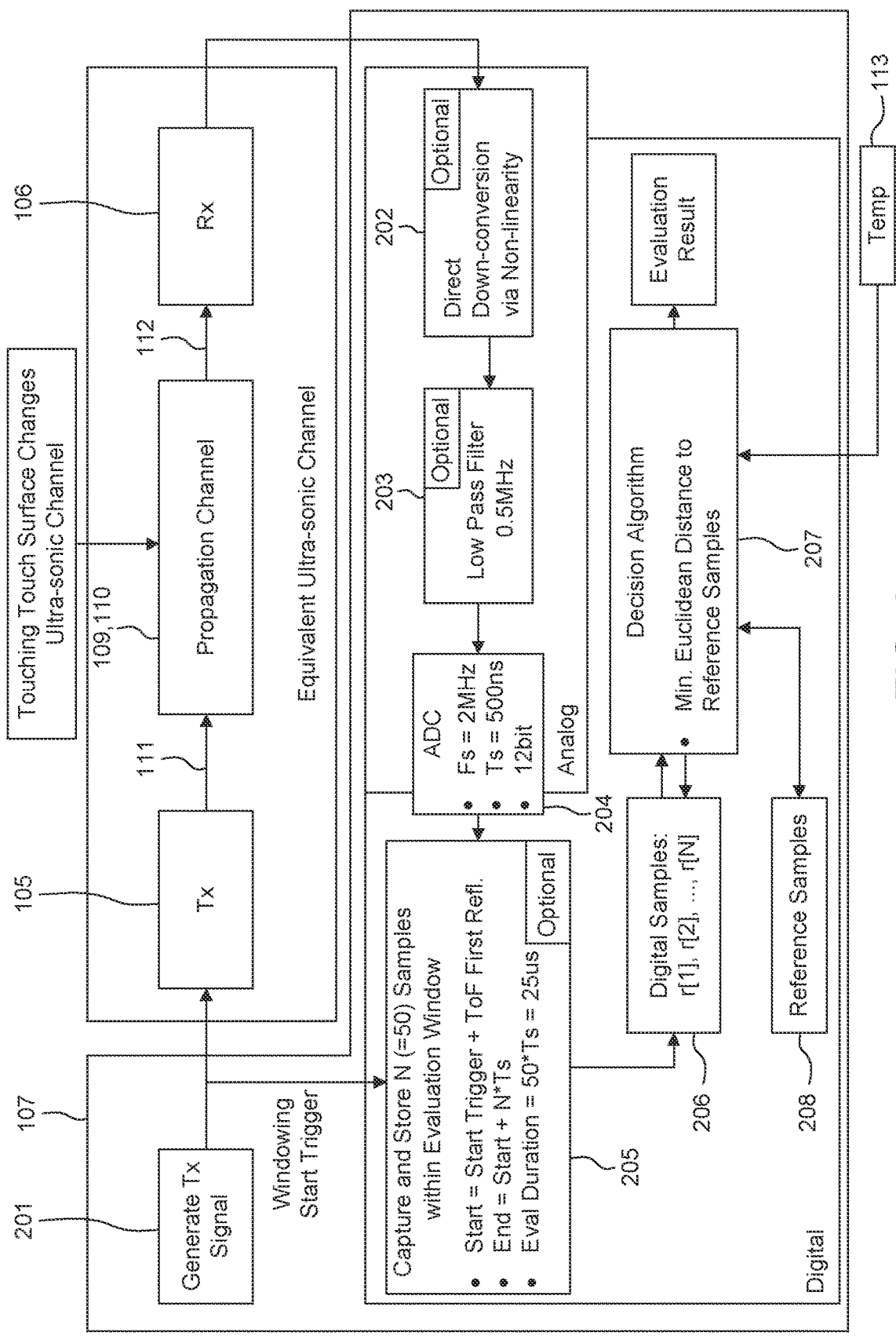
FIG. 2 illustrates a schematic block diagram of an ultra-sonic touch sensor according to one or more embodiments.

FIG. 2 illustrates a schematic block diagram of the ultra-sonic touch sensor 100A according to one or more embodiments. The ultra-sonic touch sensor 100A includes the sensor circuit 107 comprising both analog and digital domains, the transmitter 105, the propagation channel comprising both the coupling medium 109 and the inner surface 110, and the receiver 106. Together, the transmitter 105, the propagation channel, and the receiver 106 make up the equivalent ultra-sonic channel of an ultra-sonic signal. A touching of the touch surface 104 (i.e., a touch event) changes a property of the ultra-sonic channel and, more particularly, a property of the propagation channel.

The sensor circuit 107 includes a signal generator 201 that generates the ultra-sonic transmit signal and transmits the ultra-sonic transmit signal to the transmitter 105 for transmission along the propagation channel. The receiver 106 receives the ultra-sonic transmit signal 111 as a reflected ultra-sonic signal 112 whose property may have changed due to a touch event or a disturbance. The receiver 106 transmits the received receiver 106 to the processing circuitry of the sensor circuit 107.

As optional components, the processing circuitry of the sensor circuit 107 may include a down-converter 202 that directly converts the reflected ultra-sonic signal 112 into a direct current (DC) signal or baseband signal and a low-pass filter 203 that filters out any unwanted frequency components from the baseband signal.

The processing circuit of the sensor circuit 107 further includes a multi-bit ADC 204 that converts the analog signal into a multi-bit digital code or digital value according to a sampling rate (e.g., sampling frequency Fs of 2 MHz and sampling time Ts of 500 ns). In this example, the multi-bit ADC 204 is a 12-bit ADC, but is not limited thereto. The ADC 204 acquires a number of digital samples N from the reflected ultra-sonic signal 112 (e.g., from one received signal pulse) in accordance with its sampling rate and sequentially outputs the digital samples to a memory 206 (e.g., Random-Access Memory (RAM), registers, flip flops, etc.).

The processing circuit of the sensor circuit 107 may include an optional capture and store circuit 205 that determines which digital samples are captured and stored in memory 206 depending on whether the digital samples are received during an observation window. The capture and store circuit 205 may include at least one processor or may be part of a processor that determines an observation window and forwards digital samples received within the observation window to the memory 206. Essentially, the capture and store circuit 205 filters out digital samples that are received from the ADC 204 that are outside an observation window and forwards only those digital samples to memory 206 that are received during the observation window.

In this example, the number of digital samples to be captured during the observation window is set to 50 (N=50). Thus, the duration of the observation window can be calculated based on the sampling time Ts and the number of digital samples N (i.e., the time it takes for the ADC to acquire 50 samples). The start time of the observation window is calculated by the capture and store circuit 205 based on the trigger time of the ultra-sonic transmit signal, which acts as a windowing start trigger, and the estimated time-of-flight of the ultra-sonic signal from TX to RX. If a digital sample is received by the capture and store circuit 205 during the observation window, the capture and store circuit 205 transmits the digital sample to memory 206. Otherwise, the capture and store circuit 205 may discard the digital sample as not relevant. Here, the memory 206 receives and stores N samples, r[1], r[2], ..., r[N].

The processing circuit of the sensor circuit 107 further includes evaluation processing circuit 207, such as one or more processors or an artificial neural network, that receives the N samples from memory 206 and uses a decision algorithm to determine whether the N samples indicate a no-touch event or a touch event, and may further determine if the N samples indicate some other additional classification, such as no touch: "disturbance", no touch: "water drop", no touch: "dirt", no touch: "cross-talk", no touch: "noise", "touch with strength F[1]", "touch with strength F[2]", "touch with strength F[M]", touch at location L[1], touch at location L[2], touch at location L[P], etc., where P is an integer representative of a number of different touch locations or regions of the touch surface 104 that can be evaluated.

In order to determine to which classification a reflected ultra-sonic signal corresponds, a number of reference signals or reference digital samples corresponding to each classification are stored in memory 208. For example, a plurality of reference digital samples corresponding to no-touch and a plurality of reference digital samples corresponding to touch are stored in memory 208. The reference digital samples for each classification can be obtained during production after assembly of the touch sensor 100A and stored in memory 208 through testing under different types of touch and no-touch events. The number of reference digital samples can be equal to the number of digital samples N acquired by the ADC 204 during measurement and evaluation. The processing circuit 207 is configured to access memory 208 and retrieve a desired set of reference digital samples therefrom to use for the calculating Euclidean distances.

Similarly, a plurality of reference digital samples can be acquired and stored separately for no touch: "disturbance", no touch: "water drop", no touch: "dirt", no touch: "cross-talk", no touch: "noise", "touch with strength F[1]", "touch with strength F[2]", "touch with strength F[M]", touch at location L[1], touch at location L[2], touch at location L[P], etc., Thus, each classification has a corresponding number of reference samples stored and mapped thereto. Additionally, each classification may have a plurality of sets of reference samples, each set corresponding to a different temperature or temperature range. The evaluation processing circuit 207 may receive a temperature measurement from the temperature sensor 113 and select the set of reference samples for each classification to be used for evaluation based on current measured temperature.

The plurality of reference digital samples for a no-touch event may include rNoTouch[1], rNoTouch[2], ..., rNoTouch[N]. Similarly, the plurality of reference digital samples for a touch event may include rTouch[1], rTouch[2], ..., rTouch[N]. The evaluation processing circuit 207 is configured to calculate the Euclidian distance of the set of digital samples r[1], r[2], ..., r[N] to each set of reference digital samples.

For example, the evaluation processing circuit 207 may compute the Euclidian distance dNoTouch of the set of digital samples r[1], r[2], ..., r[N] to the no-touch reference samples rNoTouch[1], rNoTouch[2], ..., rNoTouch[N] according to Equation 1:

$$d\text{NoTouch}=\text{sqrt}((r[1]-r\text{NoTouch}[1])^2+\ldots+(r[N]-r\text{NoTouch}[N])^2)$$ Eq. 1.

Additionally, or alternatively, the evaluation processing circuit 207 may compute the Euclidian distance dTouch of the set of digital samples r[1], r[2], ..., r[N] to the touch reference samples rTouch[1], rTouch[2], ..., rTouch[N] according to Equation 2:

$$d\text{Touch}=\text{sqrt}((r[1]-r\text{Touch}[1])^2+\ldots+(r[N]-r\text{Touch}[N])^2)$$ Eq. 2.

In both equations Eq. 1 and 2, the square root (sqrt) calculation is optional.

A general formula for calculating the Euclidian distance $d\text{Euclidean}_i$ of the acquired digital samples (r[1], r[2], ..., r[N]) to a set i of reference samples is provided in Equation 3, where $\text{Ref}_i[1]$ is a first reference sample of the reference set i and $\text{Ref}_i[N]$ is the Nth reference sample of the reference set i. The number of reference sets can be I.

$$d\text{Euclidean}_i=\text{sqrt}((r[1]-\text{Ref}_i[1])^2+\ldots+(r[N]-\text{Ref}_i[N])^2)$$ Eq. 3.

Again, the square root (sqrt) calculation is optional. The set index i goes from 1 to I.

The evaluation processing circuit 207 may compare one or both of the Euclidian distances dNoTouch and dTouch to respective thresholds for making a determination of a no-touch or touch event. For example, evaluation processing circuit 207 may compare Euclidian distance dNoTouch to a first threshold value. If the Euclidian distance dNoTouch is less than the first threshold value Threshold 1, the evaluation processing circuit 207 may detect a no-touch event. If the Euclidian distance dNoTouch is equal to or greater than the first threshold value, the evaluation processing circuit 207 may detect a touch event. Similarly, if the Euclidian distance dTouch is less than the first threshold value Threshold 1, the evaluation processing circuit 207 may detect a touch event. If the Euclidian distance dTouch is equal to or greater than the first threshold value Threshold 1, the evaluation processing circuit 207 may detect a no-touch event.

Alternatively, the evaluation processing circuit 207 may compare the Euclidian distance dNoTouch to the Euclidian distance dTouch for making a no-touch or touch determination. For example, if dNoTouch is less than dTouch then the evaluation processing circuit 207 detects a no-touch event. In contrast, if dNoTouch is equal to or greater than dTouch then the evaluation processing circuit 207 detects a touch event. The evaluation can also be reversed in that if dTouch is less than dNoTouch then the evaluation processing circuit 207 detects a touch event and if dTouch is equal to or greater than dNoTouch then the evaluation processing circuit 207 detects a no touch event.

The evaluation can be extended to other classifications, including sub-classifications such as different types of surface contaminations for no-touch events, different amounts of contact force for touch events, and different touch locations for touch events. A hierarchy of threshold values can be used for each type of sub-classification.

For example, the evaluation processing circuit 207 may evaluate dNoTouch and/or dTouch based on the above methods to detect a no-touch event or a touch event. Once a no-touch event or a touch event, the evaluation processing circuit 207 may evaluate one or more correspond no-touch or touch sub-classifications.

For example, if dNoTouch<dTouch, indicating a no-touch event, the evaluation processing circuit 207 may be configured to compare dNoTouch to a second threshold value Threshold 2. If dNoTouch is less than Threshold 2, the evaluation processing circuit 207 may confirm the no-touch event. However, if dNoTouch is equal to or greater than Threshold 2, the evaluation processing circuit 207 may detect a surface contamination error.

If dNoTouch is not less than dTouch, indicating a touch event, the evaluation processing circuit 207 may be configured to compare dTouch to a third threshold value Threshold 3. If dTouch is less than Threshold 3, the evaluation processing circuit 207 may confirm the touch event. However, if dTouch is equal to or greater than Threshold 3, the evaluation processing circuit 207 may detect a surface contamination error.

It is noted that the three thresholds Threshold 1, Threshold 2, and Threshold 3 may be the same or different.

If dNoTouch is not less than dTouch, indicating a touch event, the evaluation processing circuit 207 may be configured to calculate additional Euclidian distances corresponding to different contact (touch) forces. For example, reference samples for a first contact force may be recorded as follows: $rTouch_{F1}[1]$, $rTouch_{F1}[2]$, ..., $rTouch_{F1}[N]$, and reference samples for a second contact force may be recorded as follows: $rTouch_{F2}[1]$, $rTouch_{F2}[2]$, ..., $rTouch_{F2}[N]$. The Euclidian distances for the digital samples r[1], r[2], ..., r[N] relative to each set of reference samples may be calculated in a similar manner represented in Equation 3 and the sub-class having the lowest Euclidian distances may be selected by the evaluation processing circuit 207. In this way, the contact force corresponding to the lowest Euclidian distances can be determined as the estimated amount of contact force applied to the touch surface 104.

If dNoTouch is not less than dTouch, indicating a touch event, the evaluation processing circuit 207 may be configured to calculate additional Euclidian distances corresponding to different contact locations on the touch surface 104. For example, reference samples for a first contact location may be recorded as follows: $rTouch_{L1}[1]$, $rTouch_{L1}[2]$, ..., $rTouch_{L1}[N]$, and reference samples for a second contact location may be recorded as follows: $rTouch_{L2}[1]$, $rTouch_{L2}[2]$, ..., $rTouch_{L2}[N]$. The Euclidian distances for the digital samples r[1], r[2], ..., r[N] relative to each set of reference samples may be calculated in a similar manner represented in Equation 3 and the sub-class having the lowest Euclidian distances may be selected by the evaluation processing circuit 207. In this way, the contact location of the touch event corresponding to the lowest Euclidian distances can be determined. A combination of determining multiple sub-classes (e.g., contact force and contact location) may also be determined.

Reference samples may also be captured and stored for different types of contaminants or disturbances as well as a touch event that occurs along with a contaminant or disturbance (e.g., a touch event through a water droplet or other material). No touch samples occurring with various types of contaminants may also be evaluated and stored as different sets of reference samples. The Euclidian distances for the digital samples r[1], r[2], ..., r[N] relative to each set of reference samples may be calculated in order to determine a type of no-touch or touch event has occurred. This can be done by determining which Euclidian distance among all sets of reference samples has the lowest value and selecting the event that has the smallest Euclidian distance.

The evaluation processing circuit 207 is configured to output an evaluation result based on the above-described decision algorithm applied to the acquired digital samples.

The sensor circuit 107 may also be configured to adapt each set of reference samples over the life-time of the touch sensor 100A to compensate for life-time effects (e.g., drift, material aging, etc.). The touch sensor 100A may be configured to acquire new reference samples via the ADC 204 in an update mode used test various no-touch and touch conditions and update each set of reference samples based on the test results for each of the test various no-touch and touch conditions.

The Euclidian distance value gives a measure for confidence. The smaller the distance the higher the confidence in the decision.

Figure 3:
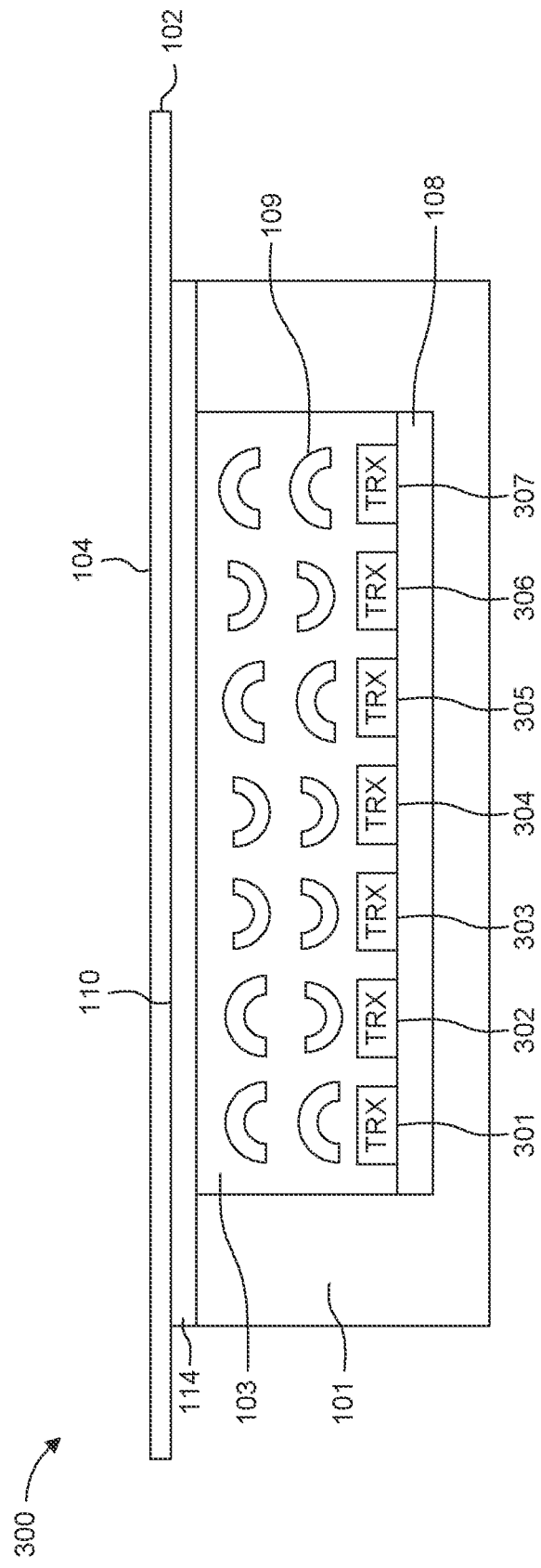
FIG. 3 illustrates another ultra-sonic touch sensor according to one or more embodiments.

FIG. 3 illustrates an ultra-sonic touch sensor 300 according to one or more embodiments. The ultra-sonic touch sensor 300 is similar to ultra-sonic touch sensor 100A or 100B but includes multiple sound transducers (transceivers TRX) 301-307 within one package. A sensor circuit (not illustrated) is also provided. The multiple transducers 301-307 may be integrated on one die arranged in a matrix or on multiple dies. The transducers 301-307 share the same coupling medium 109, package cover 114, and touch structure 102. Each sound transducer can be either a transmitter, a receiver, or act as transceiver. Cross-talk and interference between TRX elements exists, but can be measured a-priori: a set of reference signals can be generated, where the characteristic cross-talk and interference between elements is captured. For decision/evaluation of signals, the set of reference signals taking cross-talk into account are used in a similar manner described above.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Furthermore, the description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid in the understanding of the principles of the disclosure and the concepts contributed to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof. Thus, it is understood that modifications and variations of the arrangements and the details described herein will be apparent to others skilled in the art.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

What is claimed is:

1. A touch sensor, comprising:
   a housing having a recess;
   a touch structure coupled to the housing and arranged over the recess such that the recess forms an enclosed interior volume, wherein the touch structure comprises a touch surface and an inner surface arranged opposite to the touch surface, wherein the inner surface faces towards the enclosed interior volume;
   a temperature sensor arranged inside the enclosed interior volume and configured to measure a temperature;
   a memory configured to store a plurality of sets of reference samples that each corresponds to a different temperature, of a plurality of temperatures, or a different range of temperatures of a plurality of ranges of temperatures;
   a transmitter arranged inside the enclosed interior volume, wherein the transmitter is configured to transmit an ultra-sonic transmit signal towards the inner surface;
   a receiver arranged inside the enclosed interior volume and coupled to the transmitter via a propagation path, wherein the receiver is configured to receive an ultra-sonic reflected signal produced from the ultra-sonic transmit signal and the propagation path; and
   a sensor circuit, arranged inside the enclosed interior volume, configured to:
      receive the temperature from the temperature sensor,
      select, based on the temperature, a set of reference samples, of the plurality of sets of reference samples, to be used as a first plurality of reference samples,
      receive the ultra-sonic reflected signal from the receiver,
      acquire a plurality of digital samples, from the ultra-sonic reflected signal, within an observation window that starts at an expected time-of-flight of the ultra-sonic reflected signal plus a duration of the ultra-sonic transmit signal,
      calculate a difference of each digital sample, of the plurality of digital samples, from a corresponding reference sample, of the first plurality of reference samples,
      calculate a sum of the difference of each digital sample, the plurality of digital samples, from the corresponding reference sample, of the first plurality of reference samples,
      determine a first Euclidean distance of the plurality of digital samples to the first plurality of reference samples based on the sum, and
      determine whether a no-touch event or a touch event has occurred at the touch surface based on the first Euclidean distance.

2. The touch sensor of claim 1, wherein a property of the propagation path changes in response to the touch event, which changes a property of the ultra-sonic reflected signal.

3. The touch sensor of claim 2, further comprising:
   a coupling medium that fills the enclosed interior volume, wherein the coupling medium and the inner surface form at least part of the propagation path that couples the transmitter to the receiver.

4. The touch sensor of claim 3, wherein the coupling medium is a non-gaseous medium.

5. The touch sensor of claim 1, wherein:
   to determine whether the no-touch event or the touch event has occurred, the sensor circuit is configured to:
      compare the first Euclidean distance to a threshold, and
      in response to the first Euclidean distance being less than the threshold, determine that the no-touch event has occurred, or
      in response to the first Euclidean distance being equal to or greater than the threshold, determine that the touch event has occurred.

6. The touch sensor of claim 1, wherein:
   the sensor circuit is further configured to compare the first Euclidean distance to a threshold, and
   to determine whether the no-touch event or the touch event has occurred, the sensor circuit is configured to:
      in response to the first Euclidean distance being less than the threshold, determine that the touch event has occurred, or
      in response to the first Euclidean distance being equal to or greater than the threshold, determine that the no-touch event has occurred.

7. The touch sensor of claim 1, wherein the sensor circuit is further configured to calculate a second Euclidean distance of the plurality of digital samples to a second plurality of reference samples, and
   to determine whether the no-touch event or the touch event has occurred, the sensor circuit is configured to determine whether the no-touch event or the touch event has occurred based on the first Euclidean distance and the second Euclidean distance.

8. The touch sensor of claim 7, wherein:
   the sensor circuit is further configured to compare the first Euclidean distance to the second Euclidean distance, and
   to determine whether the no-touch event or the touch event has occurred, the sensor circuit is configured to:
      in response to the first Euclidean distance being less than the second Euclidean distance, or in response to the second Euclidean distance being equal to or greater than the first Euclidean distance, determine that the no-touch event has occurred, or
in response to the first Euclidean distance being equal to or greater than the second Euclidean distance, or in response to the second Euclidean distance being less than the first Euclidean distance, determine that the touch event has occurred.

9. The touch sensor of claim 8, wherein the sensor circuit is further configured to:
in response to determining the no-touch event has occurred, compare the first Euclidean distance to a first threshold, and
in response to the first Euclidean distance being less than the first threshold, confirm that the no-touch event has occurred, or
in response to the first Euclidean distance being equal to or greater than the first threshold, detect an error.

10. The touch sensor of claim 8, wherein the sensor circuit is further configured:
in response to determining the touch event has occurred, compare the second Euclidean distance to a second threshold, and
in response to the second Euclidean distance being less than the second threshold, confirm that the touch event has occurred, or
in response to the second Euclidean distance being equal to or greater than the second threshold, detect an error.

11. The touch sensor of claim 8, wherein the sensor circuit is further configured to:
in response to determining the touch event has occurred, compare the second Euclidean distance to a threshold, and
in response to the second Euclidean distance being less than the threshold, confirm that the touch event has occurred, or
in response to the second Euclidean distance being equal to or greater than the threshold, detect an error.

12. The touch sensor of claim 7, wherein the plurality of sets of reference samples comprises a first plurality of sets of reference samples and a second plurality of sets of reference samples; and
wherein the sensor circuit is further configured to:
select a first set of reference samples from among the first plurality of sets of reference samples to be used as the first plurality of reference samples based on the measured temperature, and
select a second set of reference samples from among the second plurality of sets of reference samples to be used as the second plurality of reference samples based on the measured temperature.

13. The touch sensor of claim 1, wherein, in response to detecting the touch event has occurred, the sensor circuit is further configured to:
calculate a second Euclidean distance of the plurality of digital samples to a second plurality of reference samples,
calculate a third Euclidean distance of the plurality of digital samples to a third plurality of reference samples, and
determine an amount of contact force applied during the touch event based on the second Euclidean distance and the third Euclidean distance.

14. The touch sensor of claim 13, wherein the sensor circuit is further configured to determine the amount of contact force applied during the touch event based on the first Euclidean distance, the second Euclidean distance, and the third Euclidean distance.

15. The touch sensor of claim 1, wherein, in response to detecting the touch event has occurred, the sensor circuit is further configured to:
calculate a plurality of Euclidean distances of the plurality of digital samples to a plurality of sets of reference samples, wherein each Euclidean distance of the plurality of Euclidean distances corresponds to a different set of reference samples of the plurality of sets of reference samples, and
determine an amount of contact force applied during the touch event based on the plurality of Euclidean distances.

16. The touch sensor of claim 15, wherein:
each set of reference samples of the plurality of sets of reference samples corresponds to a different amount of contact force, and
the sensor circuit is further configured to:
determine a lowest Euclidean distance among the plurality of Euclidean distances, and
correlate the lowest Euclidean distance to the amount of contact force applied during the touch event.

17. The touch sensor of claim 1, wherein, in response to detecting the touch event has occurred the sensor circuit is further configured to:
calculate a second Euclidean distance of the plurality of digital samples to a second plurality of reference samples,
calculate a third Euclidean distance of the plurality of digital samples to a third plurality of reference samples, and
determine a contact location of the touch event on the touch surface based on the second Euclidean distance and the third Euclidean distance.

18. The touch sensor of claim 17, wherein the sensor circuit is further configured to determine the contact location of the touch event based on the first Euclidean distance, the second Euclidean distance, and the third Euclidean distance.

19. The touch sensor of claim 1, wherein in response to detecting the touch event has occurred, the sensor circuit is configured to:
calculate a plurality of Euclidean distances of the plurality of digital samples to a plurality of sets of reference samples, wherein each Euclidean distance of the plurality of Euclidean distances corresponds to a different set of reference samples of the plurality of sets of reference samples, and
determine a contact location of the touch event on the touch surface based on the plurality of Euclidean distances.

20. The touch sensor of claim 19, wherein:
each set of reference samples of the plurality of sets of reference samples corresponds to a different contact location on the touch surface, and
the sensor circuit is further configured to:
determine a lowest Euclidean distance among the plurality of Euclidean distances, and
correlate the lowest Euclidean distance to the contact location of the touch event on the touch surface.

21. The touch sensor of claim 1, wherein the sensor circuit comprises:
an analog-to-digital converter that acquires the plurality of digital samples from the ultra-sonic reflected signal; and a capture and store circuit configured to:
　determine whether a digital sample from the analog-to-digital converter is received during the observation window, and
　transmit the digital sample to a memory as one of the plurality of digital samples on a condition that the digital sample is received during the observation window.

22. The touch sensor of claim 21, wherein the ultra-sonic transmit signal is a signal pulse.

23. The touch sensor of claim 1, wherein the sensor circuit is configured to update the first plurality of reference samples over time.

24. The touch sensor of claim 1, wherein the propagation path includes the inner surface that is configured to at least partially reflect the ultra-sonic transmit signal for producing the ultra-sonic reflected signal.

25. A method of sensing touch on a touch surface of a touch structure, the method comprising:
　receiving a temperature of the touch structure;
　selecting, based on the temperature, a first set of reference samples, of a plurality of sets of reference samples, wherein each of the plurality of sets of reference samples corresponds to a different temperature, of a plurality of temperatures, or a different range, of temperatures of a plurality of ranges of temperatures,
　transmitting an ultra-sonic transmit signal towards an inner surface of the touch structure that is arranged counter to the touch surface;
　receiving an ultra-sonic reflected signal produced from the ultra-sonic transmit signal;
　acquiring a plurality of digital samples from the ultra-sonic reflected signal within an observation window that starts at an expected time-of-flight of the ultra-sonic reflected signal plus a duration of the ultra-sonic transmit signal;
　calculating a difference of each digital sample, of the plurality of digital samples, from a corresponding reference sample, of the first set of reference samples;
　calculating a sum of the difference of each digital sample, the plurality of digital samples, from the corresponding reference sample, of the first set of reference samples;
　determining a first Euclidean distance of the plurality of digital samples to the first set of reference samples based on the sum; and
　determining whether a no-touch event or a touch event has occurred at the touch surface based on the first Euclidean distance.

26. The method of claim 25, wherein determining whether the no-touch event or the touch event has occurred comprises:
　comparing the first Euclidean distance to a threshold, and
　in response to the first Euclidean distance being less than the threshold, determining that the no-touch event has occurred, or
　in response to the first Euclidean distance being equal to or greater than the threshold, determining that the touch event has occurred.

27. The method of claim 25, wherein a property of a propagation path changes in response to the touch event, which changes a property of the ultra-sonic reflected signal.

* * * * *